United States Patent [19]

Kajiura

[11] Patent Number: 4,590,654
[45] Date of Patent: May 27, 1986

[54] METHOD FOR CONTROLLING AUTOMOTIVE VEHICLE ASSEMBLY AND A SYSTEM PERFORMING THE METHOD

[75] Inventor: Takatsugu Kajiura, Sayama, Japan

[73] Assignee: Nissan Motor Company, Limited, Yokohama, Japan

[21] Appl. No.: 564,675

[22] Filed: Dec. 23, 1983

[51] Int. Cl.⁴ ............... B23Q 15/13; B07L 3/20
[52] U.S. Cl. .................................. 29/407; 29/458; 29/469; 29/701; 209/3.3
[58] Field of Search ............ 29/407, 701, 702, 458, 29/469; 209/3.3, 552

[56] References Cited

U.S. PATENT DOCUMENTS

| | | | |
|---|---|---|---|
| 3,622,396 | 11/1971 | Fernandez et al. | 29/407 X |
| 4,332,012 | 5/1982 | Sekine et al. | 364/468 |
| 4,356,613 | 11/1982 | Nelson | 29/407 |
| 4,398,637 | 8/1983 | Fleury | 209/3.3 X |

FOREIGN PATENT DOCUMENTS 2620732 10/1977 Fed. Rep. of Germany .
3037354 4/1982 Fed. Rep. of Germany .

OTHER PUBLICATIONS

Jetzt Helfe Ich Mir Selbst, "VW Transporter and Bus alle Modelle".

Primary Examiner—Howard N. Goldberg
Assistant Examiner—Timothy V. Eley
Attorney, Agent, or Firm—Schwartz, Jeffery, Schwaab, Mack, Blumenthal & Evans

[57] ABSTRACT

A method and system for controlling assembly of various models, types and specifications of assemblies, such as vehicle bodies, are effective for indentifying components to be assembled to a base component. A plurality of color marks of different colors are used to identify the components to be assembled to the base component. The color marks of the same color are applied to both the base component and the component to be assembled to the base component according to the model, type and specifications of the finished assembly. Therefore, by selecting the components to be assembled to the base component having the color marks matching those appearing on the base component, selection of the proper components to be assembled onto the base component exactly according to the instructions and specifications of the finished assembly.

14 Claims, 5 Drawing Figures

METHOD FOR CONTROLLING AUTOMOTIVE VEHICLE ASSEMBLY AND A SYSTEM PERFORMING THE METHOD

BACKGROUND OF THE INVENTION

The present invention relates generally to a method for controlling assembly of an automotive vehicle or the like, in which various models of and various specifications of assemblies are transported through a common transporter and which assemblies are each formed from a plurality of differing components. More specifically, the invention relates to a method and system for identifying each component to be assembled and the required assembly process according to the model and specification of the assembly to be assembled.

In the automotive vehicle industry and so forth, various models of and specifications of vehicles are assembled by means of a common transporter line, such as a conveyor belt. In general, the various models and specifications of vehicles are transported apparently at random in accordance with a production plan.

Seeking for efficiency in manufacturing, there have been developed and proposed various systems for controlling assembly operations. For example, U.S. Pat. No. 4,332,012 to Sekine et al discloses a control system for an automotive vehicle component assembly line using a bar-code information system. In this system, all of the instructions concerning the model of the vehicle, the specification of the vehicle to be assembled and so forth are converted into a bar code compatible with a digital processor used as a controller. The bar-code is readable photo-electrically for conversion into digital data used in controlling assembly operations and identifying each component to be assembled by means of the digital controller.

The present invention proposes an improvement of the foregoing control system, which makes it easy for a line worker to visually confirm the required operation and the component to be assembled.

SUMMARY OF THE INVENTION

Therefore, it is an object of the present invention to provide a method for controlling automotive vehicle assembly by means of a visual sign enabling the line worker to confirm the required assembly operation and the component to be assembled.

Another object of the present invention is to provide a system carrying out the foregoing control method which includes applying a visual sign on the assembly at an initial stage of the assembly operation.

According to the present invention, color marks are used for identifying components to be assembled to a base component such as a body assembly to which doors, fenders and so forth are to be fitted or assembled. The color marks are applied to both the base component and the components to be assembled to the base component. The color marks are variable in color so that different colors respectively identify the different types and specifications of components to be assembled to the base component. The color marks are applied to the base components and the components to be assembled to the base components at positions exposed to the outside so that line-men in the assembly line can easily see the marks to confirm that the components assembled to the base components are those required in the instructions and specifications of the assembly.

According to one aspect of the invention, a method for controlling assembly of various types, models, and specifications of assemblies in a single assembly line, from a plurality of components, each of the components being of variable types and specifications corresponding to type, model and specification of the assembly to be assembled, comprises: forming a base component to which other components are assembled to form the assembly, applying a color mark to each of the other components, the color mark being of variable color chosen to identify the type and specification of the component, applying color marks to predetermined point of the base component, each of the color marks on the base member identifying the type and specification of the other components to be assembled to base component, and selecting components having the same color marks as those on the corresponding points of the base component and assembling the selected components to the base component.

According to another aspect, a method for controlling an assembly operation in a metal line in a vehicle body assembling, comprising of the steps: forming various models and specifications of body preassemblies and feeding the body preassemblies to the metal line, forming doors, fenders and so forth and applying color marks of respective specific colors to the doors, fenders and so forth so as to identify the type and specification of the corresponding part, sorting the doors, fenders and so forth according to the types and specifications thereof by means of the color marks thereon, applying color marks respectively identifying the types and specifications of the doors, fenders and so forth to be assembled to the body assembly to corresponding specific points of the body assembly during feeding to the metal line, each of the color marks identifying the corresponding component to be assembled and having the same color, and selecting components having the same colored marks as the body assembly and assembling same to the body assembly at the marked point.

According to the present invention, a system for controlling assembling of various models, types and specifications of assemblies in a single assembly line sequence, from a plurality of components each of which has variations of types and specifications thereof corresponding to the assemblies to be assembled, comprising: a first assembly line in the assembly line sequence for assembling a base component to which a plurality of other components are assembled to form the assembly, a second assembly line in the assembly line sequence and located downstream of the first assembly line, for assembling the other components onto the base component to complete the assembly, the second assembly line including a storage for sortingly storing the other component according to the types and specifications thereof, a plurality of sub-assembly lines respectively adapted to form respective of the other components, each of the sub-assembly lines including a station to put a color mark onto the other components formed therein for indicating types and specifications of the other components, the sub-assembly lines feeding the other components with the color marks to the storage in the second assembly line, a station located between the first and second assembly line in the assembly line sequence and adapted to put color marks onto the base components passing therethrough for identifying the other components to be assembled thereto according to model, type and specifications of the assemblies to be assembled, and means, provided in the second assembly line, for picking up each of the other components to be assembled by way of selecting the other components having the color marks same as that appearing on the base component.

BRIEF DESCRIPTION OF THE DRAWINGS

The present invention will be understood more fully from the detailed description given herebelow and from the accompanying drawings of the preferred embodiment of the invention, which however, should not be taken to limit the invention but are for explanation and understanding only.

In the drawings.

DESCRIPTION OF THE PREFERRED EMBODIMENT

Figure 1:
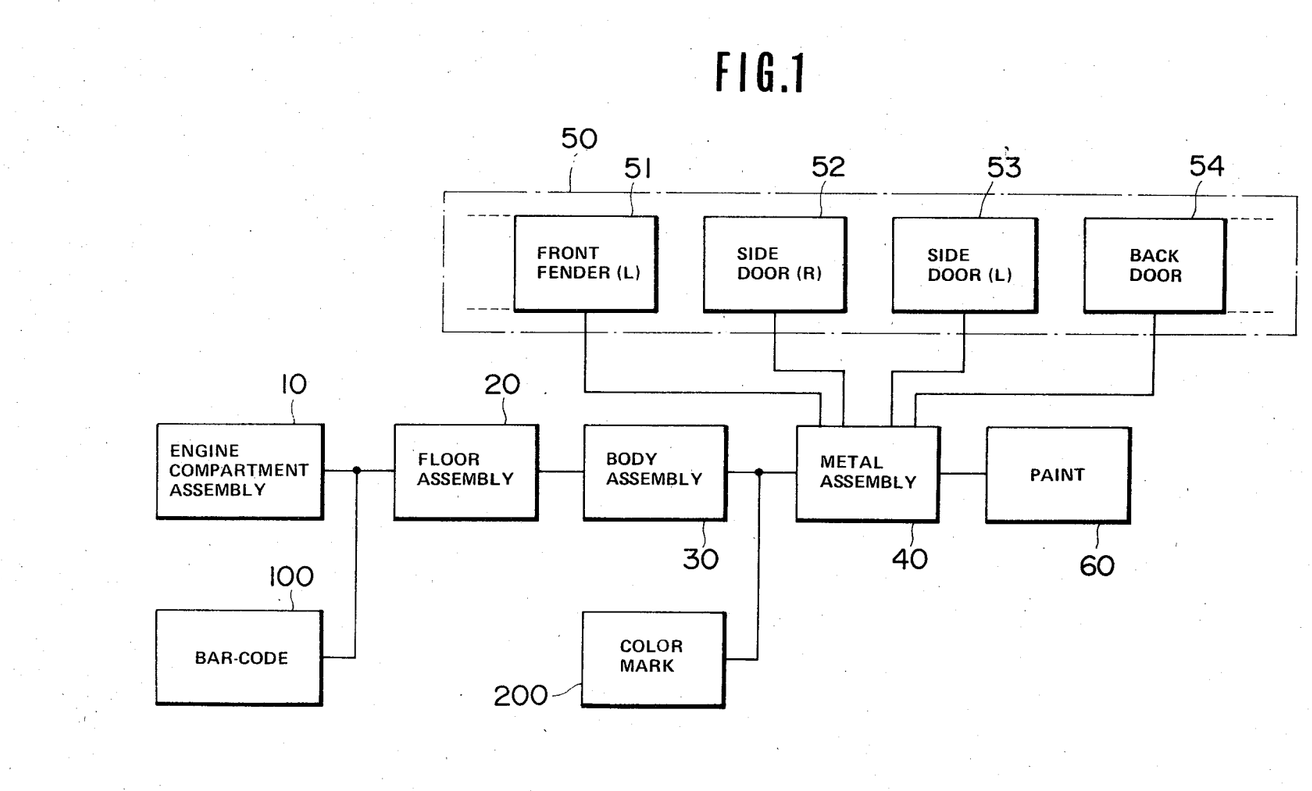
FIG. 1 is a schematic block diagram of a vehicle body assembly line in an automotive vehicle manufacturing process, in which the preferred embodiment of assembly control system according to the present invention is applied.
Figure 3:
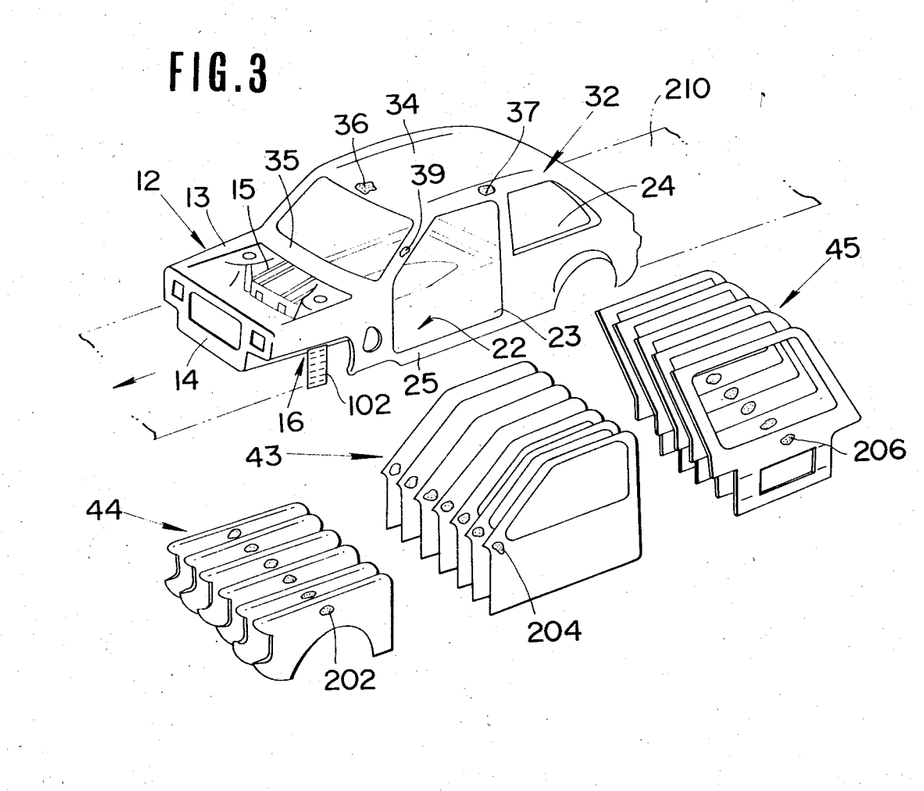
FIG. 3 shows a portion of a metal line in the vehicle body assembly line of FIG. 1.

Referring now to the drawings, particularly to FIGS. 1 and 3, an automotive vehicle body assembly line includes a line 10 for assembling an engine compartment assembly 12, which line will be referred to hereafter as an "engine compartment assembly line", a line 20 for assembling a vehicle floor assembly 22 attached to the engine compartment assembly 12, which line 20 will be referred to hereafter as a "floor assembly line", a line 30 for assembling a vehicle body 32 onto the floor assembly 22, which line 30 will be referred to hereafter as a "body assembly line", a line 40 for mounting fenders 44, side doors 43, back door 45 and other body subassemblies and components onto the body assembly 32, which line 40 will be referred to hereafter as a "metal line", and a painting line 60 for painting the previously assembled vehicle body. The engine compartment assembly line 10, the floor assembly line 20, the body assembly line 30, the metal line 40 and the painting line 60 are connected to adjoining lines by means of a well known transport system, such as a belt conveyor system, lift or the like.

The engine compartment assembly 12 generally comprises a hood ridge 13, a radiator core support 14, a cross-member 15 and so forth. The hood ridge 13, the radiator core support 14, the cross-member 15 and other members forming the engine compartment assembly are generally referred to as "engine compartment components". The floor assembly 22 comprises a front floor 23 connected to the engine compartment assembly 12, a rear floor assembly 24 and side members 25. The front floor 23, the rear floor assembly 24, side members 25 and other members constituting the floor assembly are generally referred to as "floor components". In the body assembly line 30, body sides 33, a roof 34 and cowling 35 and so forth are assembled to the floor assembly 22 to form the body assembly 32. The body side 33, roof 34, cowling 35 and other members constituting the body assembly are generally referred to as "body components". Side doors 43, fenders 44, back door 45 and so forth are assembled onto the body assembly 32 in the metal line in order to form the assembled vehicle body. The side door 43, fender 44, back door 45 and other members assembled to the body assembly in the metal line are generally referred to as "metal components".

In the automotive vehicle body assembly line according to the shown embodiment, the assembly operations of the individual assembly lines are generally controlled with regard to a bar code representative of digitial data compatible with a digital processor. A bar-code label 102 contains a specific combination of thick and thin bars representing binary "1"'s and "0"'s which convey necessary information relating to the model type, specification and so forth of the finished vehicle. Such bar-code labels 102 are prepared at a section 100. The process of preparation of the bar-code labels 102 has been disclosed in the aforementioned U.S. Pat. No. 4,332,012 to Sekine et al. The disclosure of this U.S. Pat. No. 4,332,012 is hereby incorporated by reference.

Figure 2:
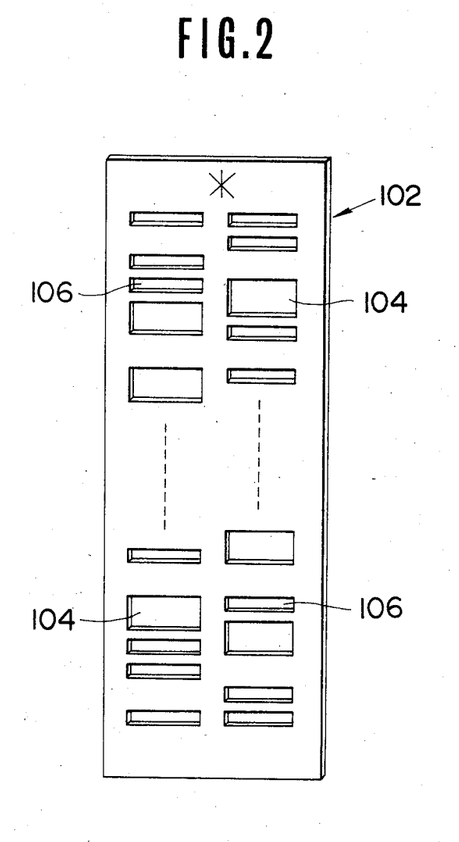
FIG. 2 shows a bar-code label used in the control system.

This bar-code label can be modified by forming the bar-code label from a metal sheet with combination of wider and narrow slits 104 and 106, as shown in FIG. 2. In this case, the printer of U.S. Pat. No. 4,332,012 would be replaced with a punch for forming the slits. Using this modified bar-code label, bar-code control can be adapted for use in the painting line to identify the required painting process according to the specified body color and so forth.

The bar-code label 102 prepared at the section 100 is attached to the engine compartment assembly 12. In the shown embodiment, the foregoing modified bar-code label 102 is attached within a front wheel house 16 of the engine compartment assembly. Although the bar-code label 102 is most conveniently attached within the front wheel house 16 in the specific embodiment, it is possible to attach the bar-code label to any point of the engine compartment assembly at which the bar-code label will be exposed during vehicle body assembly and painting.

As set forth above, in the metal line 40, right and left side doors 43, right and left fenders 44, a back door 45 and so forth are assembled to the body assembly 32 to form the assembled vehicle body. Though the disclosure has been directed to a vehicle having only front side doors and a back door sealing a hatch-back gate, the control system according to the present invention is applicable not only to this specific vehicle structure but also to any model of vehicle, such as sedans, coupes and so forth.

As can easily be appreciated, depending on the model to be assembled and the specification thereof, each metal component, i.e. side doors, fenders, back doors, etc., supplied by respective storages areas as preassemblies, are chosen in the metal line to be picked up and to be assembled to the body assembly after the body assembly operation 30.

FIG. 1 shows the storage areas 51, 52, 53, 54, each storing right-side front fenders, right-side side doors, left-side side doors, back doors or the like. To each of storage areas 51, 52, 53 and 54, various types of fenders, side doors and back doors are supplied as preassemblies from respective pre-assembly lines. Furthermore, each of the storage areas 51, 52, 53 and 54 has a plurality of sections in which the fenders, side doors and back doors are sorted according to type and construction.

In order to identify the specific metal components to be assembled to the specific body assembly and make it easier for a line worker to confirm whether the metal components match those identified in the instructions on the bar-code label, color marks 202, 204 and 206 are applied to each of the fenders 44, side doors 43 and back doors 45. The color marks are of variable color depending on the type of the metal components. The color marks are applied to the metal components at the end of each preassembly line and before conveyance to the corresponding storage area.

Corresponding color marks 36, 37 and 38 are applied to the front end of the roof 34, the front pillar 39 and the side edge of the roof of the body assembly 32. The color mark 36 on the front end of the roof 34 identifies the type of fender 44 to be added. The color mark 36 would have the same color as that on the appropriate fender and so by matching colors, the required fender can be assembled to the body assembly. The color mark 37 on the front pillar 39 identifies the type of side door 43 to be added. Similarly to the color mark 36, the color mark 37 has the same color as that on the side door which is to be attached. The color mark 38 on the side edge of the roof 34 identifies the type of back door 45 to be assembled to the body assembly.

An example of this identification will be given below for better understanding.

Assume that the vehicles to be assembled in the sequence of lines are of types A, B, C, D and E; the corresponding front fenders are of types $F_a$, $F_b$, $F_c$; the corresponding side doors are $D_a$, $D_b$, $D_c$; and the corresponding back doors are $B_a$ and $B_b$, and the various types of vehicles are assembled according to the following table:

| Vehicle type | Fender | Side Door | Back door |
| --- | --- | --- | --- |
| A | $F_a$ | $D_a$ | $B_a$ |
| B | $F_b$ | $D_b$ | $B_a$ |
| C | $F_c$ | $D_c$ | $B_a$ |
| D | $F_b$ | $D_a$ | $B_b$ |
| E | $F_a$ | $D_a$ | $B_b$ |

As will be appreciated from the above table, when the vehicle of type A is to be assembled, a type $F_a$ fender 44, a type $D_a$ side door 43 and a type $B_a$ back door 45 are to be used. Furthermore it should be noted that the type $F_a$ fender is commonly applicable to vehicles of types A and E, and the type $D_a$ side doors are applicable to vehicles of types A, D and E. Therefore, some of the metal components are commonly used in various types of vehicles.

In order to identify the type of each metal component, color marks on the vehicle according to the following table are used:
color mark 36 $F_a$:white $F_b$:yellow $F_c$:orange color mark 202
color mark 37 $D_a$:red $D_b$:blue $D_c$:pink color mark 204
color mark 38 $B_a$:green $B_b$:brown color mark 206

Therefore, for vehicles of type A, front fenders 44 with the color mark 202 in white, side doors 43 with the color mark 204 in red and back doors 45 with the color mark 206 in green are used. Similarly, to assemble a vehicle of type C, front fenders 44 of type $F_c$ (the color marks 36 and 202 are both orange), side doors 43 of type $D_c$ (the color marks 37 and 204 are both pink) and back doors 45 of type $B_a$ (the color marks 38 and 206 are both green) are assembled to the body assembly 32.

Figure 4:
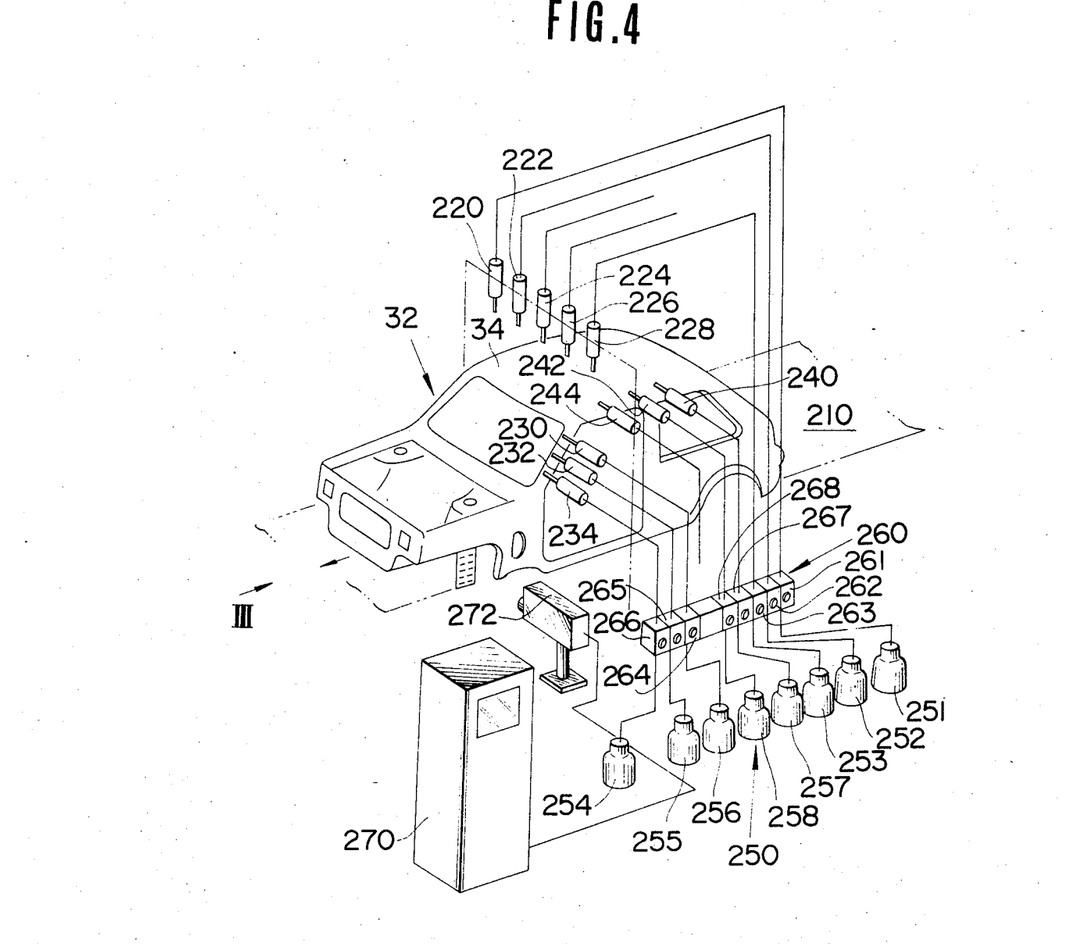
FIG. 4 is an illustration of a color mark section in the system of FIG. 1.
Figure 5:
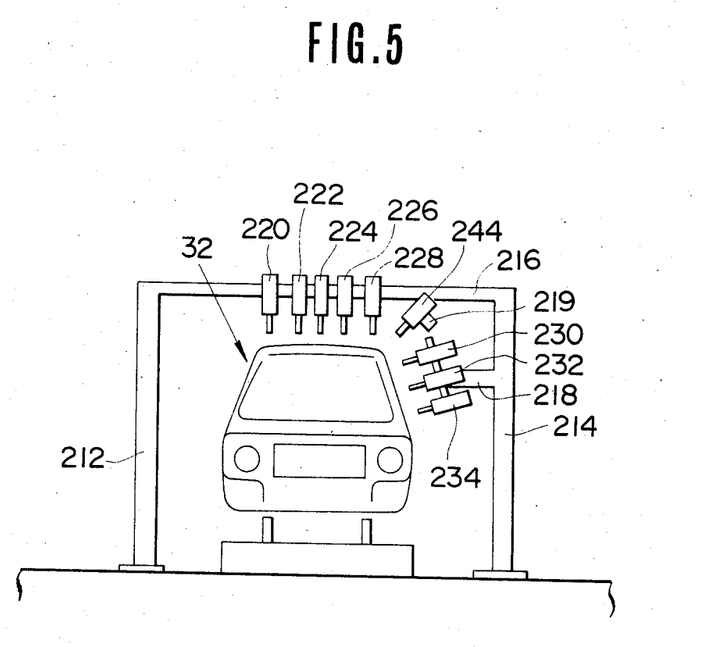
FIG. 5 is a front elevation of the color mark section of FIG. 4.

In order to apply the color marks 36, 37 and 38 to the body assembly, the system according to the shown embodiment is provided with a section 200 for applying the color marks. As shown in FIGS. 4 and 5, the color mark section 200 is located along the conveyor belt 210 between the body assembly line 30 and the metal line 40.

A pair of support frames 212 and 214 extend vertically on both sides of the transporting conveyor 210 and support a lateral frame 216 extending between the vertical support frames 212 and 214 across the transporting conveyor, as shown in FIG. 5. A first group of spray nozzles 220, 222, 224, 226, 228 is supported on the lateral support frame at a point facing the front end of the roof 34 of the body assembly 32 on the conveyor. The first group of spray nozzles are adapted to apply the color mark 36 identifying the type and specification of the front fender 44 to be added. A second group of spray nozzles 230, 232 and 234 are so located as to face the front pillar 39 and are supported by a lateral extension 218 of the vertical support frame 214. The second group of spray nozzles 230, 232 and 234 is adapted to apply the color mark 37 to the front pillar of the body assembly 32 to identify the type and specification of the side door 43 to be added. A third group of spray nozzles 240, 242 and 244 is located opposite the vehicle roof side edge on a longitudinal extension 219 of the vertical support frame 214. The third group of spray nozzles 240, 242 and 244 is adapted to apply the color mark 38 to the side edge of the roof 34 to identify the type and specification of the back door 45 to be added..

Each of the spray nozzles is connected to a paint reservoir tank 250 via an electromagnetically operated control valve 260, such as a solenoid valve. The paint within each reservoir tank 250 is pressurized to a predetermined pressure so that the paint is injected through the spray nozzle whenever the control valve 260 opens. Each control valve 260 is connected to a controller 270 comprising a digital processor and is responsive to a control signal from the controller to supply and shut off the supply of the paint. In turn, the controller 270 is connected to an optical reader 272 adapted to read the bar code in the bar-code label 102 attached on the wheel house of the body assembly. The bar-code reader 272 feeds a binary-code signal representative of the instructions and information relating to the model, specification and so forth for the vehicle body to be assembled, to the controller 270.

The controller 270 may include a display 274 for displaying the data read by the bar-code reader 272 in addition to controlling the control valves 261, 262, 263, 264, 265, 266, 267 and 268 to selectively apply the color marks 36, 37 and 38 to the body assembly.

The paint reservoir tanks 251, 252, 253, 254, 255, 256, 257 and 258 contain differing colors of paint corresponding to the colors of the color marks 36, 37 and 38.

In operation, the transporting conveyor 210 temporarily stops at the color mark section 200 for a predetermined period of time. At this position, the bar-code label 102 on the wheel house of the body assembly 32 is positioned opposite the bar-code reader 272. The bar-code reader 272 optically reads the bar-code data and feeds the read data to the controller 270. The controller 270 judges the type and specification of the fender 44, the side door 43 and back door 45 to be assembled to the specific body assembly currently at the color mark section, based on the input data from the bar-code reader. According to this judgment, the controller actuates one of the control valves 261, 262 and 263 to feed paint to one of the first group of spray nozzles 220, 222, 224, 226 and 228 in order to apply the color mark 36 with the specific color corresponding to the type and specification of the required front fender. Similarly, according to the judgment, the controller 270 feeds a control signal to one of the control valves 264, 265 and 266 to feed the selected color of paint to the appropriate one of the spray nozzles 230, 232 and 234 in the second group in order to apply the color mark 37 to the front pillar 39 of the body assembly. In this case, the color of paint to be fed to the selected one of the spray nozzles 230, 232 and 234 represents the type and specification of the side door identified by the bar-code and to be assembled to the body assembly.

The controller 270 further feeds a control signal to one of the control valves 267 and 268. According, paint from the corresponding paint reservoir tank 257 or 258 of a color identifying the selected type and specification of the back door 45 is fed to corresponding one of the spray nozzles 240, 242 and 244 to apply the color mark 38 to the side edge of the roof 34.

After the predetermined period ends and the color marks 36, 37 and 38 have been applied to the body assembly, the transporting conveyor resumes operation to transport the body assembly 32 with the color marks to the metal line 40.

In the metal line, the front fender 44, the side doors 43 and the back door 45 having color marks 202, 204 and 206 matching the colors of the color marks 36, 37 and 38 are removed from the respective storage areas 51, 52, 53, 54. When the color marks 202 and 36 match, the front fenders 44 are assembled to the body assembly 32. Similarly, when the color marks 204 and 37 match, the side doors are added and when the color marks 206 and 38 match, the back door or doors 45 are assembled to the body assembly 32.

As will be appreciated, the color marks applied to both the body assembly and each of the metal components do not need to be so large as to increase production costs. The size of the color mark need only be big enough for the line worker to see easily. Furthermore, it would be preferable to use soluble paint so that the color marks can be dissolved and removed in the first process in painting line 60.

According to the present invention as set forth above, identification of the metal component to be assembled to the vehicle body base can be provided in a visually recognizable form to make the worker's judgment easier. This improves the productivity of the manufacturing line of the automotive vehicle body.

Although the specific embodiment has been described above in order to disclose the invention, the invention is applicable to any manufacture wherein various types and specifications of products are produced from a plurality of components, each of which may vary in construction and/or specification. For example, though the specific embodiment has been directed to control of the metal line operation in vehicle body assembly, the same or similar procedure may be applied to any of the vehicle body assembly lines. Furthermore, similar systems may be applied to identifying components, such as dashboard, chairs, head lamps and so forth in a finishing line in which the vehicle is finished.

What is claimed is:

1. A method for controlling assembly of various types of assemblies in a single assembly line from a plurality of components, each of said components being variable in type in correspondence with the type of assembly to be assembled, the method comprising the steps of:

sequentially feeding information concerning type and identification of components to be assembled into final assemblies, in an order of assembly;

preparing first encoded signs according to the information and identification sequentially provided, each of said encoded signs containing information of the corresponding final assembly to be assembled and identification of the components to be assembled;

forming a base component to which other components are assembled to form the assembly of the type corresponding to that identified by said information and identification;

attaching one of said encoded signs on said base component;

applying a first visual marking for each of said other components, said first visual marking being variable for identifying the type of the corresponding individual component;

reading said attached encoded sign on said base component for recognizing identification of other components to be assembled to said base component for forming the final assembly of the type identified by said encoded sign;

applying a plurality of second visual markings on predetermined portions of said base component, each of said second visual markings identifying one component to be assembled to said base component and having said first visual marking identical thereto; and selecting said other components, each having the said first visual marking identical to the corresponding second visual marking and assembling the selected components to said base component.

2. A method for controlling assembly of various types of assemblies in a single assembly line from a plurality of components, each of said components being variable in type in correspondence with the type of assembly to be assembled, the method comprising the steps of:

preparing a bar-code label carrying a bar-code representative of one of the types of assemblies and identifying components to be assembled;

forming a base component to which other components are assembled to form the assembly corresponding to that identified by said bar-code;

attaching said bar-code label onto said base component at a predetermined position of said base component;

reading said bar-code on said bar-code label and deriving said other components to be assembled to said base component;

applying a color mark on each of said other components, said color mark being of variable color chosen to identify the type of said component;

applying color marks on predetermined portions of said base component, each of said color marks on said base component corresponding to the information contained in said bar-code and identifying the type of said other components to be assembled to said base component in the vicinity of said predetermined portions; and selecting said other components having the same color marks as those on the corresponding portion of said base component and attaching the selected components to said base component.

3. The method as set forth in claim 2, which further comprises the step of obtaining information identifying each of said other components and choosing the colors of said color marks in correspondence with the other components to be assembled.

4. The method as set forth in claim 3, in which said color mark is formed of a water-soluble paint.

5. The method as set forth in claim 4, which is applicable to assembly of various types, models and specifications of vehicle bodies and for attaching doors, fenders and other vehicle body-related components to body assemblies, and the colors of the color marks identify the various types of said doors, fenders and other components.

6. The method as set forth in claim 4, in which said information is obtained optically from said bar code.

7. The method as set forth in claim 6, in which a specific color of paint is selected on the basis of the obtained information relating to each of said the other components for identifying the other components to be attached to the base component.

8. A method for controlling an assembly operation in a metal line of a vehicle body assembly line, comprising the steps of:
preparing a bar-code label carrying a bar-code representative of one of a plurality of types of assemblies and identifying components to be assembled;
forming various models of body preassemblies and feeding the body preassemblies to said metal line;
attaching said bar-code label onto said base component at a predetermined position of said base component;
forming a plurality of body subassemblies and putting color marks of specific distinct colors identifying the types of each of said subassemblies;
sorting the body subassemblies in a storage area according to the types thereof as identified by said color marks;
reading said bar-code on said bar-code label and deriving said other components to be assembled to said base component;
putting color marks having a color matching those of the body subassemblies identified by said bar-code and to be attached to said body preassembly to corresponding positions of said body assembly; and
selecting subassemblies having color marks of the same color as a body preassembly and attaching same to the body preassembly.

9. The method as set forth in claim 8, which further comprises the step of applying information relating to models, types and specifications of the vehicle onto the vehicle body preassembly upstream of the metal line, said information being encoded on a component attachable to the body preassembly.

10. The method as set forth in claim 9, wherein the selection of colors for each of the color marks is made in accordance with the information in said bar code.

11. The method as set forth in claim 10, wherein the information is read from said bar code by way of an optical reader which outputs a digital signal representative of the read information to a digital processor which controls selection of colors for the color marks applied to said body preassembly.

12. The method as set forth in claim 11, wherein said color marks are applied to the body subassemblies and preassembly with a water-soluble paint.

13. The method as set forth in claim 12, wherein said color marks are removed in a first step of a painting process.

14. A method for controlling an assembly operation in a metal line of a vehicle body assembly line, comprising the steps of:
sequentially feeding information concerning types, models and specifications of various body assemblies to be assembled in a single sequence of assembly lines and identification of components to be assembled into final vehicle body assemblies, in an order to assembly;
preparing encoded signs according to the information of the types, models and specifications of the vehicle body assembly to be assembled and identification sequentially provided, each of said encoded signs containing information of the corresponding final assembly to be assembled and identification of the components to be assembled;
forming a body preassembly to which one or more body subassemblies are to be assembled for forming desired type, model and specification of vehicle body assembly, and feeding said body preassembly to the metal line;
providing various body subassemblies each of which corresponds to the type, model and specification of said body assembly as a final assembly in said metal line;
attaching one of said encoded signs on said body preassembly;
applying a first visual marking for each of said subassemblies, said first visual marking being variable for identifying the type of the corresponding individual subassembly;
reading said encoded sign on said body preassembly for recognizing identification of one or more subassemblies to be assembled to said body preassembly for forming the final assembly of the type identified by said encoded sign;
applying a plurality of second visual markings on predetermined portions of said body preassembly, each of said second visual markings identifying one or more subassemblies to be assembled to said body preassembly and having said first visual marking identical thereto; and
selecting said subassemblies, each having the said first visual marking identical to the corresponding second visual marking and assembling the selected components to said body preassembly.

* * * * *